UNITED STATES PATENT OFFICE.

JOHN GUSTAF ADOLF RHODIN, OF MANCHESTER, ENGLAND.

PROCESS OF OBTAINING SOLUBLE POTASSIUM SALTS FROM FELSPAR.

SPECIFICATION forming part of Letters Patent No. 641,406, dated January 16, 1900.

Application filed October 27, 1899. Serial No. 734,977. (No specimens.)

*To all whom it may concern:*

Be it known that I, JOHN GUSTAF ADOLF RHODIN, a subject of the King of Sweden and Norway, and a resident of 47 Victoria Buildings, Manchester, in the county of Lancaster, England, have invented certain new and useful Improvements in the Production of Soluble Potassium Salts from Felspar, (orthoclase,) of which the following is a specification.

My invention relates to a process for the production of readily-soluble potassium salts from felspar (orthoclase) which contains potash in an insoluble form and as such cannot be utilized for manurial and manufacturing purposes.

In carrying my invention into effect I mix in any suitable proportions felspar (orthoclase) with lime and common salt, all in a finely-powdered condition.

I find that the following proportions give good results in practice—namely, one part felspar, (orthoclase,) one part lime or equivalent weight of limestone, (carbonate of lime,) .2 part of salt. These proportions may be varied or modified and are merely given as an example. I then heat the mixture, either in a closed vessel of iron or other suitable material or else in an open-hearth or blast furnace, to a bright yellow heat and maintain it at that heat for a considerable time, care being taken not to melt or fuse the mixture. The result of the reaction is that the lime attacking the felspar forms with the latter an easily-decomposable silicate of a zeolite nature, the salt merely acting as a semivolatilized flux or conveyer to obviate fusion and to reduce the temperature at which the reaction takes place. After cooling the mixture, which still remains in a powder, it will be found that the potassium in the felspar is in such a state that it will combine readily with hydrochloric, sulphuric, and other acids to form soluble salts suitable for manurial and manufacturing purposes.

When necessary, any ordinary method of separation and purification may be employed in order to obtain pure potash salts.

When preferred, the treated mixture, which, as previously stated, will be still in a powdered condition, may be applied directly as manure without first subjecting it to the acid treatment.

For agricultural purposes an excess of lime is always advantageous, as the lime itself has valuable manurial properties.

Having now particularly described and ascertained the nature of my said invention and in what manner the same is to be performed, I declare that what I claim, and desire to secure by Letters Patent of the United States, is—

The herein-described process for the production of soluble potassium salts from felspar (orthoclase) said process consisting in heating a finely-powdered mixture, in suitable proportions, of felspar (orthoclase), lime, and common salt to a sufficient heat to cause reaction without melting or fusion, substantially as herein set forth, for the purposes specified.

In witness whereof I have hereunto set my hand in presence of two witnesses.

JOHN GUSTAF ADOLF RHODIN.

Witnesses:
S. W. GILLETT,
HERBERT R. ABBEY.